United States Patent
Charlton et al.

(10) Patent No.: US 10,934,020 B2
(45) Date of Patent: Mar. 2, 2021

(54) METHOD AND SYSTEM FOR JOINING STRUCTURES

(71) Applicant: The Boeing Company, Chicago, IL (US)

(72) Inventors: Craig A. Charlton, Charleston, SC (US); Branko Lakic, Kirkland, WA (US); Jerald A. Hull, Charles, SC (US); Christopher A. Greer, Wadmalaw, SC (US); Justin H. Pratt, Mount Pleasant, SC (US)

(73) Assignee: The Boeing Company, Chicago, IL (US)

( * ) Notice: Subject to any disclaimer, the term of this patent is extended or adjusted under 35 U.S.C. 154(b) by 552 days.

(21) Appl. No.: 15/415,172

(22) Filed: Jan. 25, 2017

(65) Prior Publication Data

US 2018/0208328 A1    Jul. 26, 2018

(51) Int. Cl.
*B23P 21/00*    (2006.01)
*B64F 5/10*    (2017.01)
(Continued)

(52) U.S. Cl.
CPC ............... *B64F 5/10* (2017.01); *B23B 35/00* (2013.01); *B23B 49/00* (2013.01); *B23P 21/00* (2013.01);
(Continued)

(58) Field of Classification Search
CPC ... B64F 5/10; B64C 1/10; B64C 1/065; B23B 35/00; B23B 49/00; B23B 2215/04; B23P 21/00; B23P 2700/01
See application file for complete search history.

(56) References Cited

U.S. PATENT DOCUMENTS 5,898,590 A  *  4/1999  Wampler ............. G05B 19/401
33/504
8,756,792 B2    6/2014  Boyl-Davis et al.
(Continued)

FOREIGN PATENT DOCUMENTS

EP    2 727 821    5/2014
EP    3 028 940    6/2016
(Continued)

OTHER PUBLICATIONS

European Patent Office, "Extended European Search Report," App. No. 17203735.0 dated Jun. 5, 2018.
(Continued)

*Primary Examiner* — David P Bryant
*Assistant Examiner* — Nirvana Deonauth
(74) *Attorney, Agent, or Firm* — Walter & Wasylyna LLC

(57) ABSTRACT

A method includes making a first structure with a first plurality of pre-drilled holes at pre-defined locations, making a second structure with a second plurality of pre-drilled holes at pre-defined locations, making a third structure without pre-drilled full-size holes, measuring the location and orientation of the first and second plurality of pre-drilled holes in the first and second structures, determining the location of a third plurality of holes to be drilled in the third structure that correspond to first and second plurality of pre-drilled holes measured in the first and second structures, creating a program to drill the third plurality of holes in the third structure that align with the measured location and orientation of the first and second plurality of pre-drilled holes in the first and second structures based on the measure location and orientation of the first and second plurality of pre-drilled holes in the first and second structure, drilling the third plurality of holes in the third structure based on the program, positioning the third structure on the first and (Continued)

second structures such that the third plurality of holes in the third structure are aligned with the first and second plurality of pre-drilled holes in the first and second structures, and inserting fasteners through the third plurality of holes and the first and second plurality of predrilled holes that are aligned with the third plurality of holes to secure the second structure to the first structure using the third structure.

20 Claims, 13 Drawing Sheets

(51) Int. Cl.
  *B23B 49/00* (2006.01)
  *B23B 35/00* (2006.01)
  *B64C 1/10* (2006.01)
  *B64C 1/06* (2006.01)
(52) U.S. Cl.
  CPC ............... *B64C 1/065* (2013.01); *B64C 1/10* (2013.01); *B23B 2215/04* (2013.01); *B23P 2700/01* (2013.01)

(56) References Cited

U.S. PATENT DOCUMENTS

| | | | |
|---|---|---|---|
| 9,429,935 B2 | 8/2016 | Boyl-Davis et al. | |
| 9,952,580 B2 | 4/2018 | Bode et al. | |
| 2004/0068338 A1 | 4/2004 | Macy et al. | |
| 2010/0161094 A1 | 6/2010 | Crothers | |
| 2011/0046917 A1* | 2/2011 | Lippuner | G01B 21/045 702/150 |
| 2011/0119919 A1* | 5/2011 | Crothers | B23P 19/10 29/897.2 |
| 2014/0365061 A1 | 12/2014 | Vasquez et al. | |
| 2016/0152317 A1* | 6/2016 | Reeves | B64C 1/069 244/131 |
| 2017/0220021 A1* | 8/2017 | Bode | G05B 19/19 |

FOREIGN PATENT DOCUMENTS

| | | |
|---|---|---|
| EP | 3 199 298 | 8/2017 |
| JP | 2012 024920 | 2/2012 |
| WO | WO 01/76943 | 10/2001 |
| WO | WO 2009/128992 | 10/2009 |
| WO | WO 2011/062696 | 5/2011 |

OTHER PUBLICATIONS

European Patent Office, "Communication pursuant to Article 94(3) EPC," App. No. 17 203 735.0 dated Jan. 28, 2020.
European Patent Office, "Communication pursuant to Article 94(3) EPC," App. No. 17 203 735.0 dated Sep. 7, 2020.
Canadian Intellectual Property Office, Office Action, App. No. 2,985,786 dated Dec. 8, 2020.

* cited by examiner

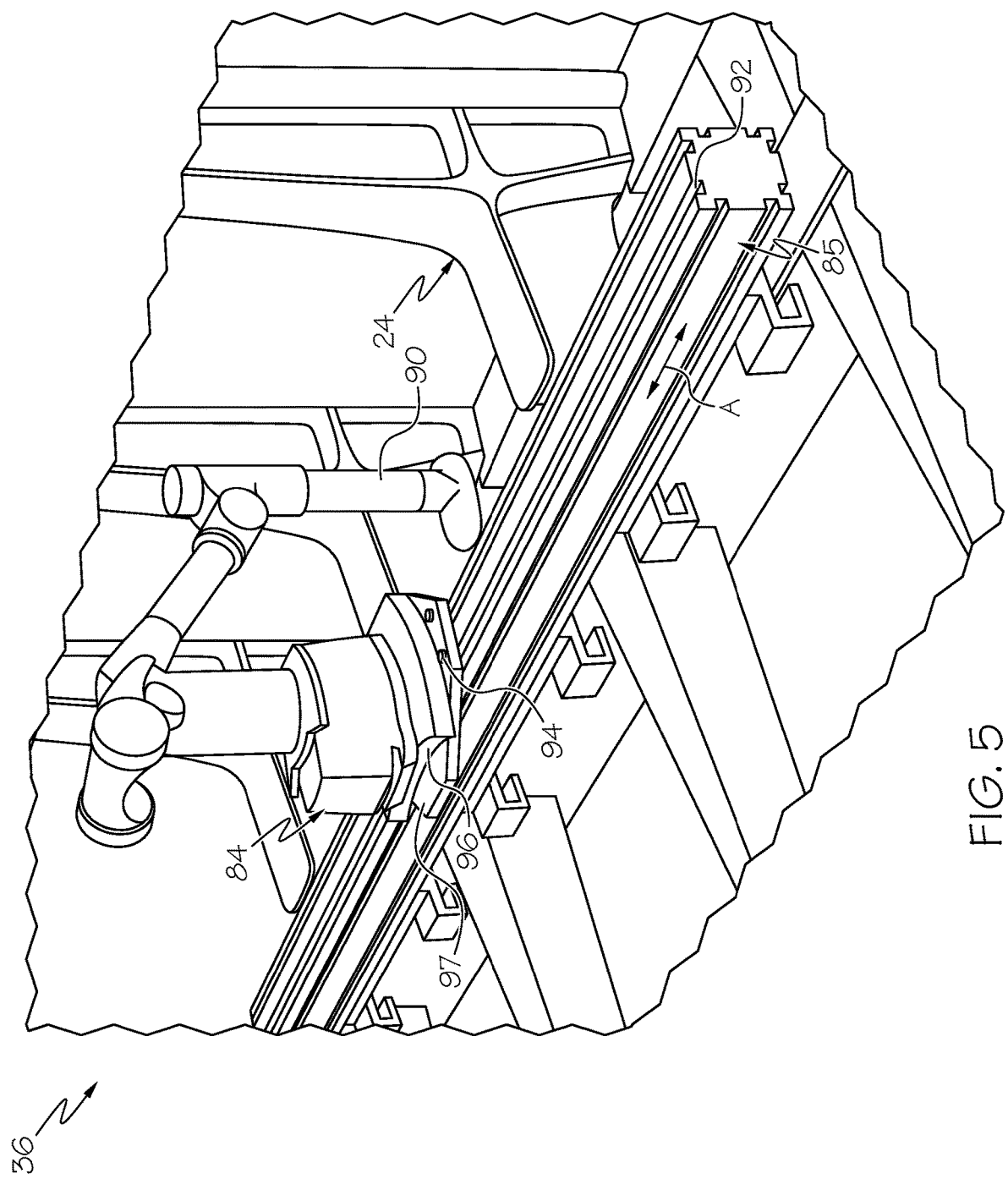

METHOD AND SYSTEM FOR JOINING STRUCTURES

FIELD

This application relates to a system and method for joining structural components and, more particularly, for joining structural components, such as pieces of aircraft structure, by drilling and fastening fasteners to the structural components.

BACKGROUND

Accurate hole location is critical to the attachment of the pieces or parts of an assembly during a manufacturing process. To achieve this objection, overlapping pieces are typically drilled while assembled to each other using a drill jig to ensure that the holes in each pieces match to each other. However, the use of the drill jigs to drill primary structure joints, especially, titanium, is not a very stable drilling platform which results in large percentage of oversize holes and associated production tags. Further, the areas in which the joints are drilled may not be ergonomically accessible for drilling and assembly such as in large scale integration and major joint areas mainly associated with the primary structure components around the perimeter of the fuselage and/or in the wing box cavity of an airplane. This type of drilling is also very time consuming. In addition, drilling of the primary structure components at the airplanes creates significant amount of foreign object debris which requires manual cleaning. Also, large manual tools are required for drilling holes for some of the large fuselage and wing integration fasteners. These large manual tools can create drilling access issues in the confined area.

SUMMARY

In one embodiment, a method is provided. The method includes making a first structure with a first plurality of pre-drilled holes at pre-defined locations, making a second structure with a second plurality of pre-drilled holes at pre-defined locations, making a third structure without pre-drilled full-size holes, measuring the location and orientation of the first and second plurality of pre-drilled holes in the first and second structures, determining the location of a third plurality of holes to be drilled in the third structure that correspond to the first and second plurality of pre-drilled holes measured in the first and second structures, creating a program to drill the third plurality of holes in the third structure that align with the measured location and orientation of the first and second plurality of pre-drilled holes in the first and second structures based on the measure location and orientation of the first and second plurality of pre-drilled holes in the first and second structure, drilling the third plurality of holes in the third structure based on the program, positioning the third structure on the first and second structures such that the third plurality of holes in the third structure are aligned with the first and second plurality of pre-drilled holes in the first and second structures, and inserting fasteners through the third plurality of holes of the third structure and the first and second plurality of predrilled holes of the first and second structures that are aligned with the third plurality of holes of the third structure to secure the second structure to the first structure using the third structure.

In another embodiment, a method is provided. The method includes making the first structure with first pre-drilled holes at pre-defined locations, making the second structure without pre-drilled full-size holes, measuring the location and orientation of the first pre-drilled holes in the first structure, determining the location of second holes to be drilled in the second structure that correspond to the first holes measured in the first structure, creating a program to drill the second holes in the second structure that align with the measured location and orientation of the first pre-drilled holes in the first structure based on the measure location and orientation of the first pre-drilled holes in the first structure, drilling the second holes in the second structure based on the program, positioning the second structure on the first structure such that the second holes in the second structure are aligned with the first pre-drilled holes in the first structure, and inserting fasteners through the aligned first and second holes of the first and structures to secure the second structure to the first structure.

In another embodiment, a system for fastening a first structure to a second structure is provided. The system includes a measurement machine. The measurement machine is configured to take measurements of the location and orientation of a first plurality of pre-drilled holes in the first structure and a second plurality of pre-drilled holes in the second structure. The system includes a measurement program. The measurement program is configured for executing a measurement plan for the measurement machine to take measurements of the location and orientation of the first plurality of pre-drilled holes in the first structure and the second plurality of pre-drilled holes in the second structure. The system includes at least one processor for processing the measurements of the first plurality of pre-drilled holes in the first structure and the second plurality of pre-drilled holes in the second structure. The system also includes an ODEM station. The ODEM station is configured to generate an NC program for drilling holes in the third structure based on the processed measurements of the first plurality of pre-drilled holes in said first structure and the second plurality of holes in the second structure. The system also includes a CNC machine. The CNC machine is configured for drilling holes in the third structure based on the NC program. The system also includes fasteners. The fasteners are inserted into the drilled holes of the third structure and the first and second plurality of the pre-drilled holes in the first and second structures that are aligned with the drilled holes of the third structure to fasten the first structure to the second structure.

In another embodiment, a structural assembly for an aircraft is provided. The structural assembly includes a stub beam, a transverse beam, a splice, and fasteners. The stub beam includes a first plurality of pre-drilled holes. The transverse beam includes a second plurality of pre-drilled holes. The stub beam is joined to the transverse beam by the splice. The splice includes holes drilled by a CNC machine. The location of the drilled holes of the splice are based on the measured locations and orientation of the first plurality of pre-drilled holes of the stub beam and the second plurality of pre-drilled holes of the transverse beam. A first plurality of the fasteners are inserted into aligned holes of the first plurality of pre-drilled holes of the stub beam and a first group of the drilled holes of said splice. A second plurality of fasteners are inserted into aligned holes of the second plurality of pre-drilled holes of the transverse beam and a second group of the drilled holes of the splice.

Other embodiments of the disclosed method and system and associated structural assembly will become apparent

BRIEF DESCRIPTION OF THE DRAWINGS

FIG. 5 is a perspective view of a portion of a fuselage of an aircraft showing the part of the structure and a ROMER arm machine (one type of an articulated arm coordinate measurement machine) mounted on a platform according to the embodiment of FIG. 1;

DETAILED DESCRIPTION

Figure 1:
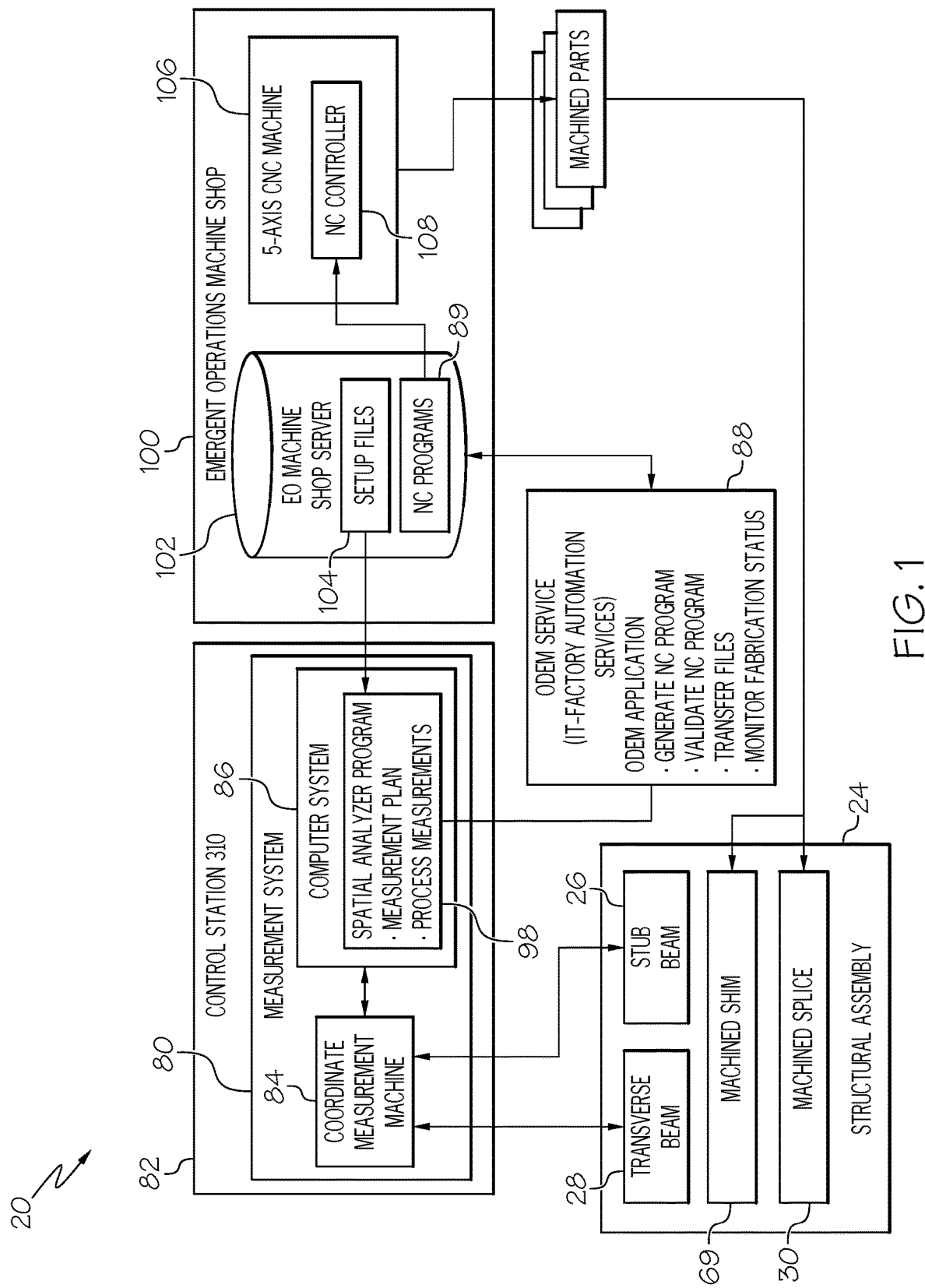
FIG. 1 is a block diagram of the system for joining structural components according to one embodiment.
Figure 2:
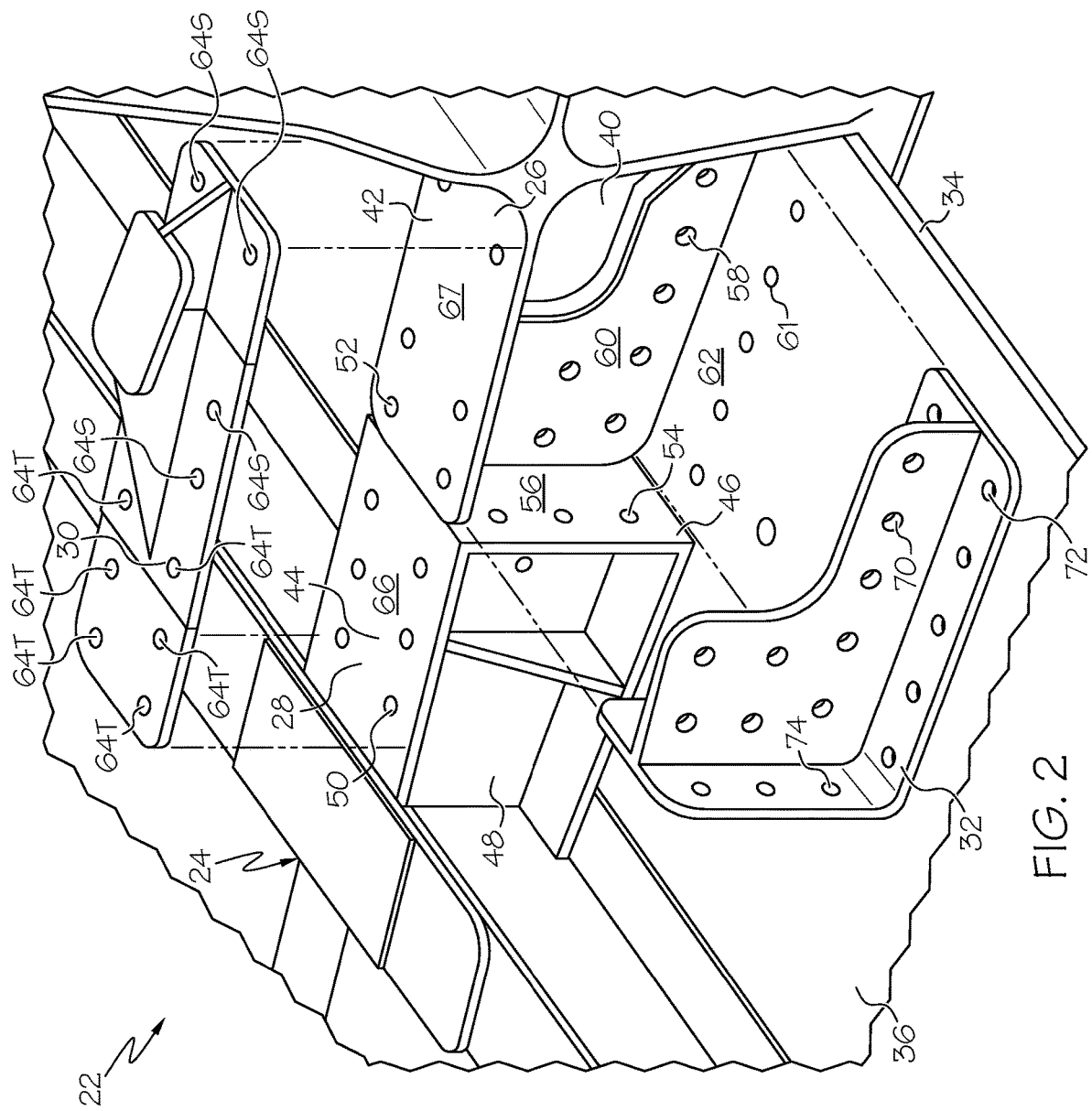
FIG. 2 is a partial exploded view of the structure having the structural components according to the embodiment of FIG. 1

FIG. 1 illustrates a system 20 for joining structural components by drilling and fastening fasteners to the structural components. In one application, the structural components may be work pieces of an aircraft structure 24 (FIG. 2). However, those skilled in the art will appreciate that various types of structural members may be connected together using the disclosed system 20 and method, whether for aerospace applications or non-aerospace applications, without departing from the scope of the present disclosure.

FIG. 2 shows a portion of an aircraft 22 that has an exemplary structure 24 that is mounted on the aircraft 22. The structure 24 includes a stub beam 26 and a transverse beam 28 that is joined to the stub beam 26 by an upper splice 30 and a lower attach fitting 32. The structure 24 is mounted on the horizontal pressure deck 34 of the fuselage 36 of the aircraft 22 at a waterline surface 62. The stub beam 26 includes a base 40 that extends vertically relative to the pressure deck 34 and an upper plate 42 that is attached to the top of the base 40. The edge of the upper plate 42 that is adjacent to the transverse beam 28 extends slightly beyond the base 40. The transverse beam 28 includes an upper plate 44 and a side plate 46 that are attached to a base 48. The side plate 46 faces the stub beam 26. Six pre-drilled holes 50 are located in the upper plate 44 of the transverse beam 28 and six pre-drilled holes 52 are located in the upper plate 42 of the stub beam 26. Six pre-drilled holes 54 are located in the side plate 46 of a base 48 along the butt line mating surface 56. Nine pre-drilled holes 58 are located on the station surface 60 of the base 40 of the stub beam 26. Ten pre-drilled holes 61 are located on the horizontal pressure deck 34 at the waterline mating surface 62.

Figure 3:
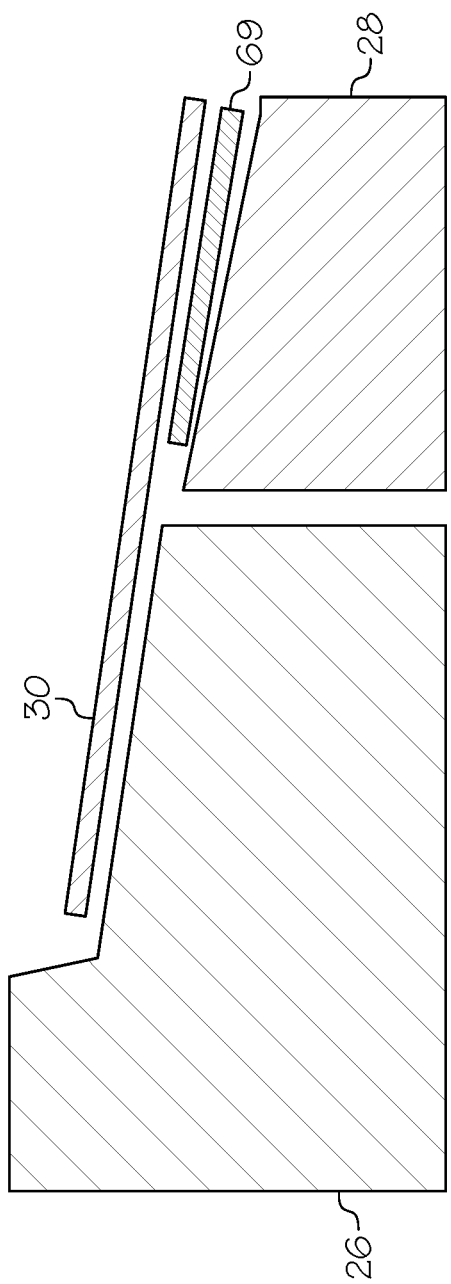
FIG. 3 is a schematic side view of the stub beam, transverse beam, and upper splice arrangement with a shim according to the embodiment of FIG. 1.
Figure 4:
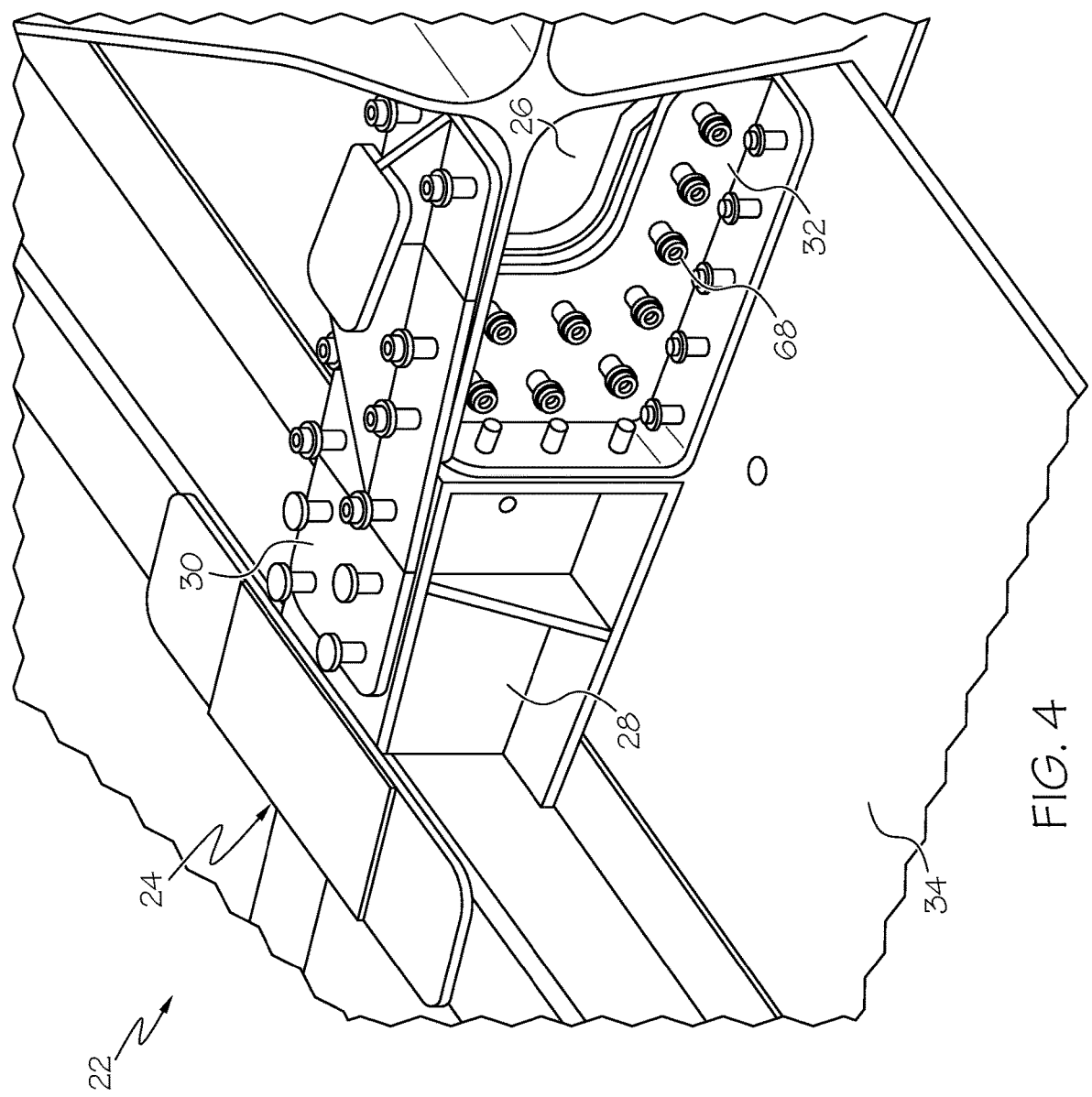
FIG. 4 is a perspective view of a portion of a fuselage of an aircraft showing the assembly of the embodiment of FIG. 1.

The upper splice 30 includes twelve drilled holes 64T, 64S. Six of these drilled holes 64T are aligned with the six holes 50 of the upper plate 44 of the transverse beam 28. The other six holes 64S are aligned with the six holes 52 of the upper plate 42 of the stub beam 26. The mating surface 66 between the upper splice 30 and the transverse beam 28 may be shimmed by a shim 69 if the mating surface 66 does not coincide with the mating surface of the Upper Fitting 30, as schematically illustrated in FIG. 3. The flatness profile tolerances for the mating surface 66 may be, for example, 0.010 inches. With the surfaces of the upper splice 30 mated, spaced and shimmed (if required), fasteners 68 (FIG. 4) are installed through the drilled holes 50, 52, 64T, 64S, by hand without the use of any tools.

The lower attach fitting 32 includes twenty five drilled holes 70, 72, 74. Nine drilled holes 70 are aligned with the holes 58 on the station mating surface 60, ten drilled holes 72 are aligned with the ten pre-drilled holes 61 located on the horizontal pressure deck 34 at the waterline surface 62, and six drilled holes 74 are aligned with the six pre-drilled holes 54 located in the side plate 46 of the base 48 along the butt line mating surface 56. The lower attach fitting 32 shall be installed as follows. First, the station mating surface 60 of the lower attach fitting 32 and the stub beam 26 shall be net fit according to the design requirements. Second, the lower attach fitting 32 shall be positioned against the butt line mating surface 56 and shimmed as needed. Third, the lower attach fitting 32 shall be positioned against the waterline mating surface 62 of the horizontal pressure deck 34, and shimmed as needed. With the surfaces of the lower attach fitting 32 mated and shimmed (if required), fasteners 68 (FIG. 4) are installed through the drilled holes 70, 72, 74, by hand without the use of any tools until the gap between the fastener head and the outer surface of the lower attach fitting 32 is less than a predetermined amount.

Referring to FIG. 1, the system 20 makes accurate measurements of the structure 24 while on the airplane, processes those measurements and then machines mating blank fittings (e.g. drilling holes) and machining shims that comply with the required tolerances. The system 20 includes a measurement system 80 located at a control station 82. The measurement system 80 includes a Coordinate Measurement Machine (CMM) 84 and a computer system 86. The measurements in the CMM 84 are sent to the computer system 86. The computer system 86 provides the interface for a user to execute a measurement plan, process the measurements, and provide the processed measurements in an .XML format to an on demand emergent manufacturing (ODEM) service 88.

The CMM 84 measures an object in a 3D coordinate system, often in comparison to a computer aided design (CAD) model. The CMM 84 makes measurements of the structural components of the structure for drilling the holes and adding the necessary shims. The CMM 84 may be mounted on a stable platform 85 (FIG. 5) that prevents the CMM 84 from rocking in order to take accurate measurements. The CMM 84 may be any suitable metrological machine. The CMM 84 may be a Portable Coordinate Measuring machine. For example, the CMM 84 may be an articulated measurement arm (measurement arm) such as a ROMER arm machine as shown in FIG. 5. The ROMER arm machine 84 includes a robotic arm 90 that operates in 3D space with six or seven joints, comprising six degrees of freedom, which means that the arm 90 can move in three-dimensional space forward/backward, up/down, left/right combined with rotation about three perpendicular axes (roll, yaw, pitch). The movement along each of the three axes is independent of each other and independent of the rotation about any of these axes, comprising the six degrees of freedom. The ROMER arm machine 84 may be slidably mounted on a track 92 (FIG. 5) of the platform 85 adjacent the structures 24 for movement along the track 92 to take measurements of selected areas on the structures 24. As seen in FIG. 5, four fasteners 94 (two are shown) are threadily fastened through the base 96 of the ROMER arm machine 84 and base plate 97 and into the track 92 to secure the ROMER arm machine 84 to the track 92. Loosening the fasteners 94 allows the ROMER arm machine 84 to slide along the track 92 to a selected position. The fasteners 94 then may be tightened to stably secure the ROMER arm machine 84 to the track 92 at the selected position to measure an area on the structure 24. Repeated measurements are done on the structure 24 and compared to ensure that the ROMER arm machine 84 is sturdy. When repeated measurements are close enough to each other to be within the predetermined allowed margin of error, the ROMER arm machine 84 is sufficiently sturdy. Other suitable types of CMMs with sufficient accuracy may be used to take measurements of the areas of the structure 24 such as a hand held measuring device or a laser scanner. The stable platform 85 is positioned adjacent to the first and second structures and secured to the fuselage 36, and preferably has a length sufficient to be positioned adjacent to (and span along) a plurality of the first and second structures, such that the ROMER arm machine 84 is slidably mounted on the track 92 to take measurements, at a plurality of the first and second structures, of the location and orientation of the first plurality of pre-drilled holes in the first structure and second plurality of pre-drilled holes in the second structure. Accordingly, the system may be configured to generate a plurality of NC programs for drilling holes in a plurality of third structures based on successively obtained measurements, at a plurality of the first and second structures, of the first plurality of pre-drilled holes and second plurality of holes in said second structure.

The system may also include three dimensional (3D) measurement seed models that correspond to each set of stub beam 26, transverse beam 28, and horizontal pressure deck 34 in nominal configurations including nominal full size holes, directions, and surface geometry. For the exemplary structure 24, the measurement seed model shall identify the five mating surfaces 56, 60, 62, 66 and 67 as shown in FIG. 2. The measurement seed models may contain a measurement point for each full size hole center point and adjacent mating surface point with labeling.

The computer system may include a measurement software platform. The measure software platform may be any suitable type that includes programs that help take and process measurements. One exemplary measurement software platform may be a spatial analyzer 98. The spatial analyzer 98 may link the three dimensional (3D) measurement seed models. For each stub beam 28 to transverse beam 28 joint locations, the spatial analyzer 98 leads the operator through a measurement plan to acquire the seed model measurements consistent with certain measurement practices defined as follows.

Figure 6A:
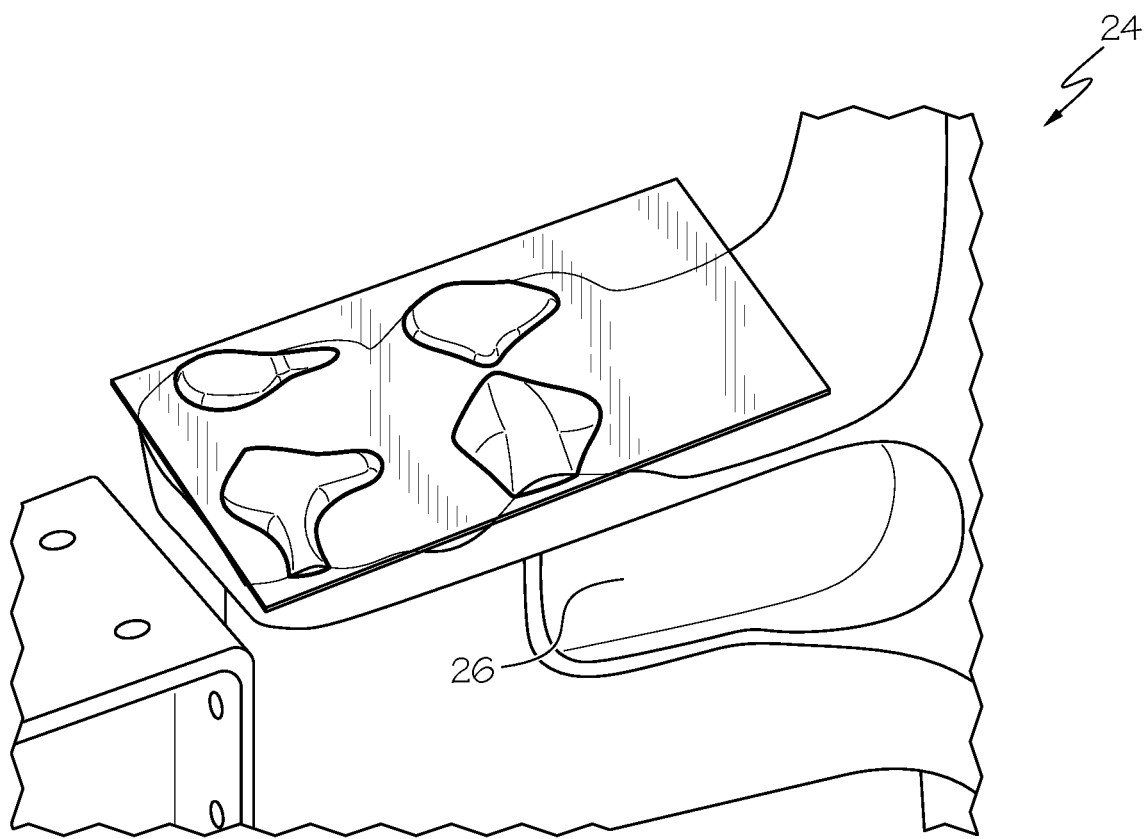
FIG. 6A is a perspective view of a portion of a fuselage of an aircraft showing the part of the structure and mating surface illustrating a best fit of the measured exaggerated surface profile according to the embodiment of FIG. 1.
Figure 6B:
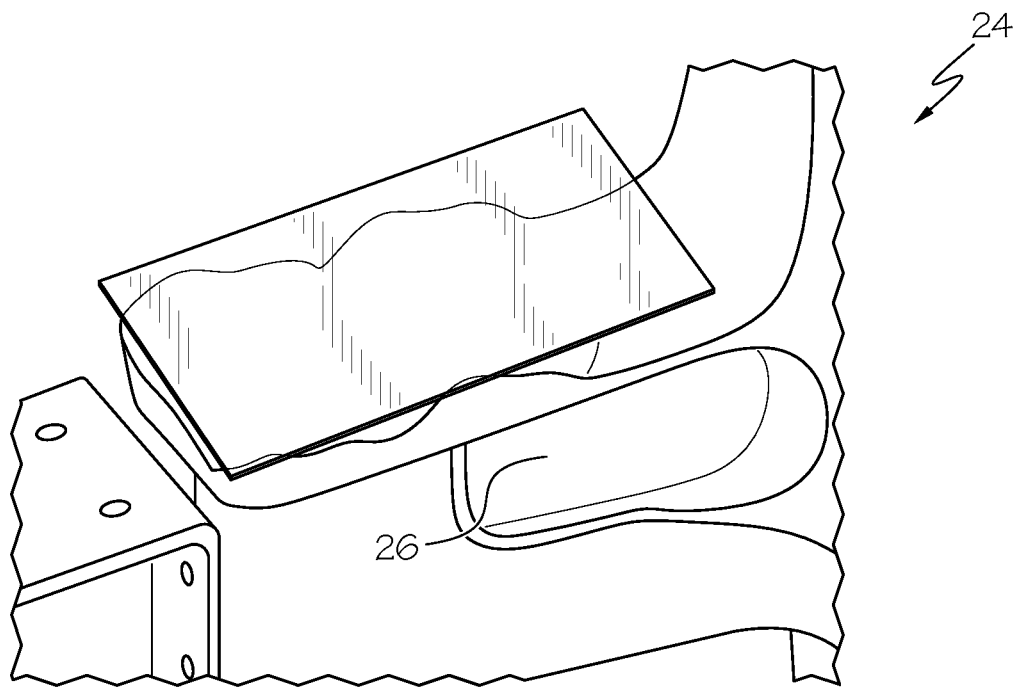
FIG. 6B is similar to FIG. 6A except that the exaggerated surface is shown to be offset along the plane normal to the mating surface.

For each of the joint locations, and each fitting or splice, the spatial analyzer 98 operates to lead the operator through the measurements and processing as needed resulting in the coordinate system transform from the as-mounted CMM coordinate system to the 3D NC seed model in a nominal aircraft coordinate system for each upper splice, lower attach fitting or other fitting. The flatness profile tolerances for all the mating surfaces of the exemplary structure is 0.010 inches thereby compromising the overall system tolerance requirements. To compensate for this potential error without changing current flatness requirements, the spatial analyzer 98 may constrain all measured mating surface values to lie within or between the respective derived datum mating surface plane and the nominal mating surface of the same as-built part measured. For example, as shown in FIG. 6A, the surface shown is a best fit of the measured exaggerated surface profile. The same surface shall be offset along the plane normal as depicted in FIG. 6B so all peaks lie in or under the derived surface. The surface measurements shall include at least one measurement at each fastener location across the entire mating surface.

Figure 7:
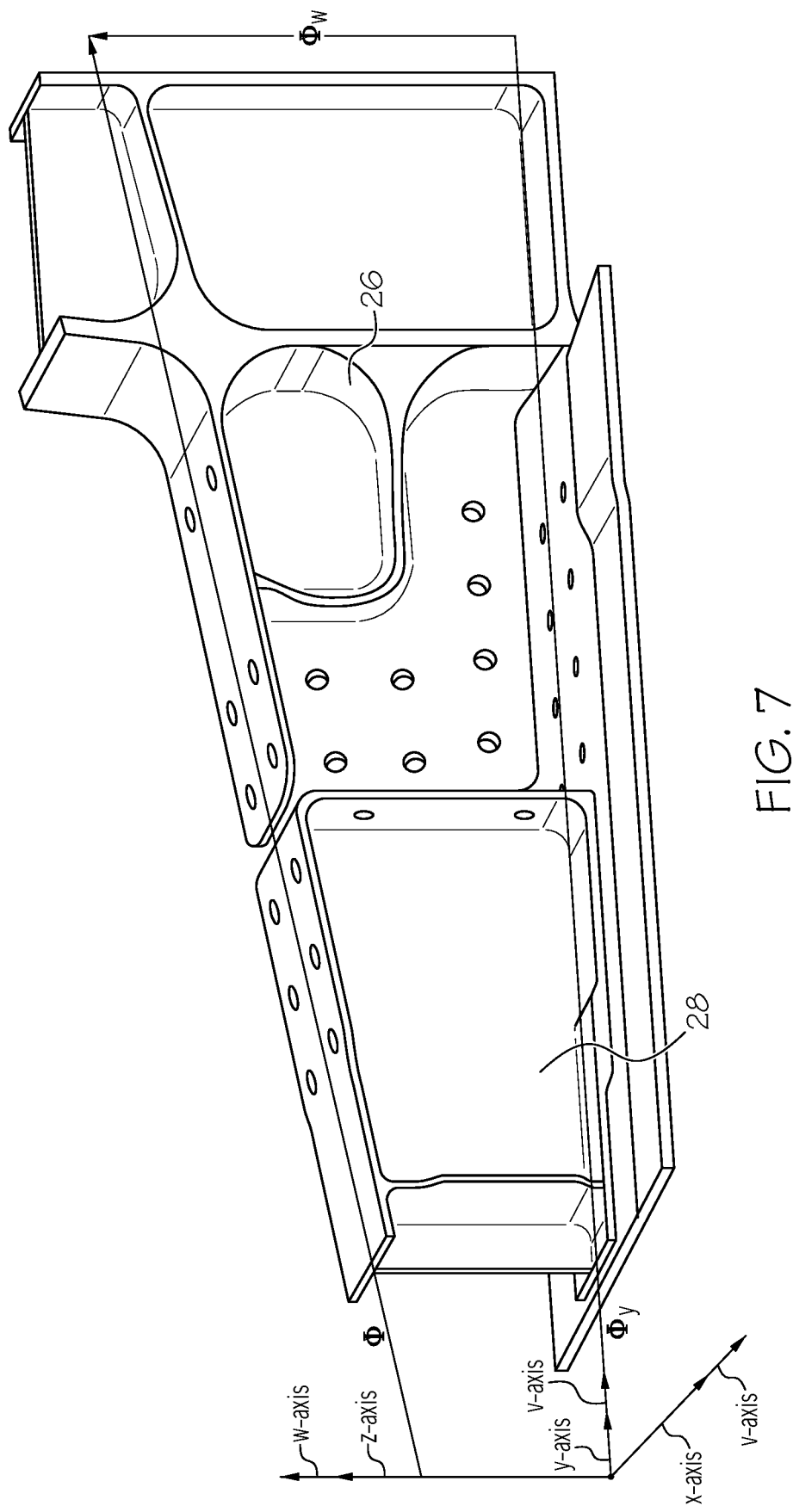
FIG. 7 is a side perspective view of the stub beam and transverse beam arrangement according to the embodiment of FIG. 1.

For each of the upper splices 30, the spatial analyzer 98 shall derive the mating surface plane for the upper splice thereby representing the alignment transform components of translation along the Z-axis, rotation about X-axis, and rotation about Y-axis. In this exemplary structure 24, since the stub beam surface makes an angle of 7.8923 degrees with respect to the aircraft X-Y plane rotated about the aircraft X-axis, a transformation is included as multipliers on the measured values along Y, Z, V, and W. For example, a rotation $\phi$ of the stub beam surface about an axis lying in the nominal surface plane and parallel to the airplane Y-Z plane, represents component rotations of $\phi V$ about Y and $\phi W$ about Z as depicted in FIG. 7.

After creating the upper splice alignment transform, the spatial analyzer 98 may lead the operator to measure the remaining stub beam 26 and transverse beam 28 hole points. After performing the lower attach fitting alignment transformation, the spatial analyzer 98 may lead the operator to measure the remaining lower attach fitting measurements. After all the measurement points have been acquired and validated within acceptable drift and scale tolerances, the spatial analyzer 98 shall identify mating surfaces for potential shimming and/or spacing for the upper splice fittings 30 to stub beam 26 and transverse beam 28. Once the upper splice potential shim and spacer surfaces have been measured and designated, the spatial analyzer 98 shall determine their geometry. Depending on the lower attach fitting 32 as-built datum orthogonality, the lower attach fitting shim geometry requirements may need to include probe measurements of the as-built fitting to determine the total shim thickness.

Then, the spatial analyzer 98 shall determine the shim geometry for the butt line mating surface 56 and waterline mating surface 62. For each shim 69, each upper splice 30, and each lower attach fitting 32 measurement set, the spatial analyzer generates a corresponding .XML measurement file incorporating the processed measurements that is compliant with ODEM format requirements.

As illustrated in FIG. 1, the computer system 86 provides the processed measurements in the .XML format to the on demand emergent manufacturing (ODEM) service 88. The ODEM service 88 generates and then validates the network computer (NC) programs 89 to drill full size holes, machine all the fittings, and fabricate all the necessary shims and spacers, when provided with the compatibly formatted .XML measurement files and NC seed models. Each hole to be drilled will have an XYZ point to be drilled and an associated plane, which determines the orientation of the hole to be drilled. The ODEM service 88 also monitors the fabrication status of the drilled or machined part. The ODEM service 88 also transfers the network computer programs to a server 102 at an Emergent Operations machine shop station 100. The server 102 includes setup files 104 that reflect the allowable tolerances of the drilled holes and shims and the quality assurance provisions per product definition data along with measurement plans, index plans, and installation plans. The Emergent Operations machine 100 also includes a Computer Numerically Control (CNC) 5-axis milling machine 106, or equivalent. The CNC machine 106 includes a network computer controller 108 that receives the NC programs 89. The system 20 takes measurements, processes the measurements in accordance with the requirement document in an .XML format. The .ODEM service 88 then updates the NC seed model with the .XML formatted data, and then automatically creates the requisite NC program 89.

Figure 8:
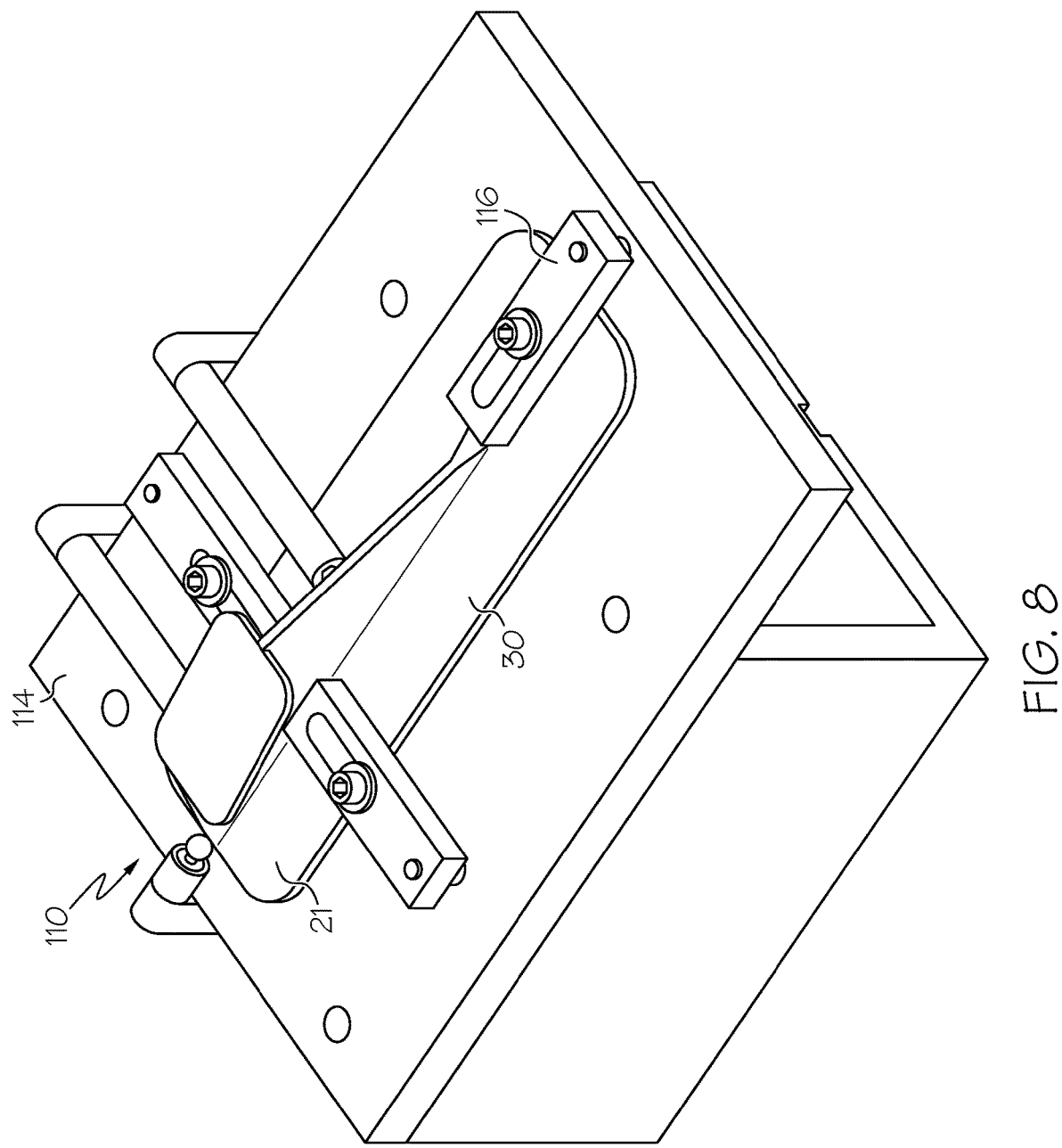
FIG. 8 is a top perspective view of the upper splice clamped on a drilling fixture according to the embodiment of FIG. 1.
Figure 9:
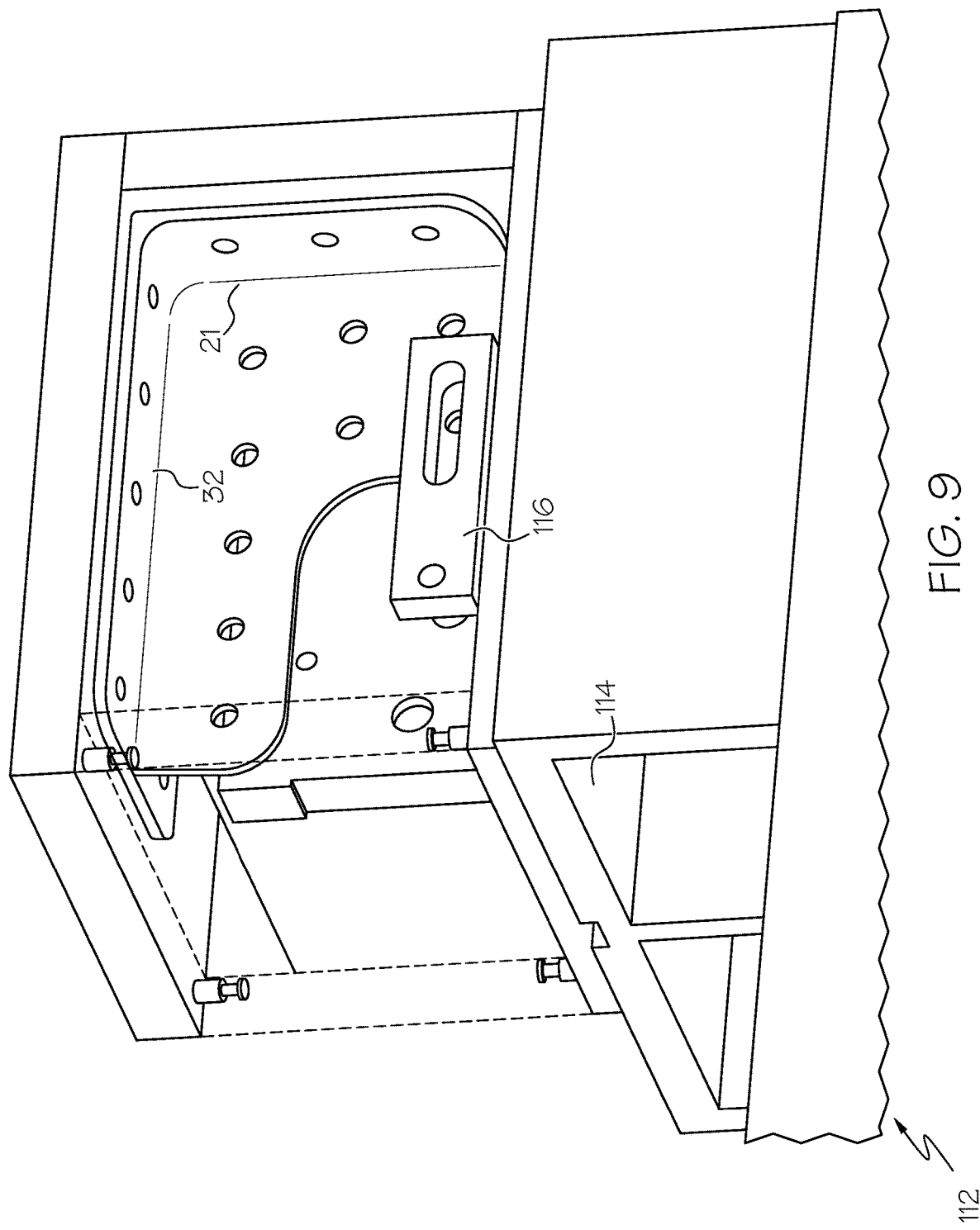
FIG. 9 is a bottom perspective view of the lower attach fitting clamped on a drilling fixture according to the embodiment of FIG. 1.
Figure 10:
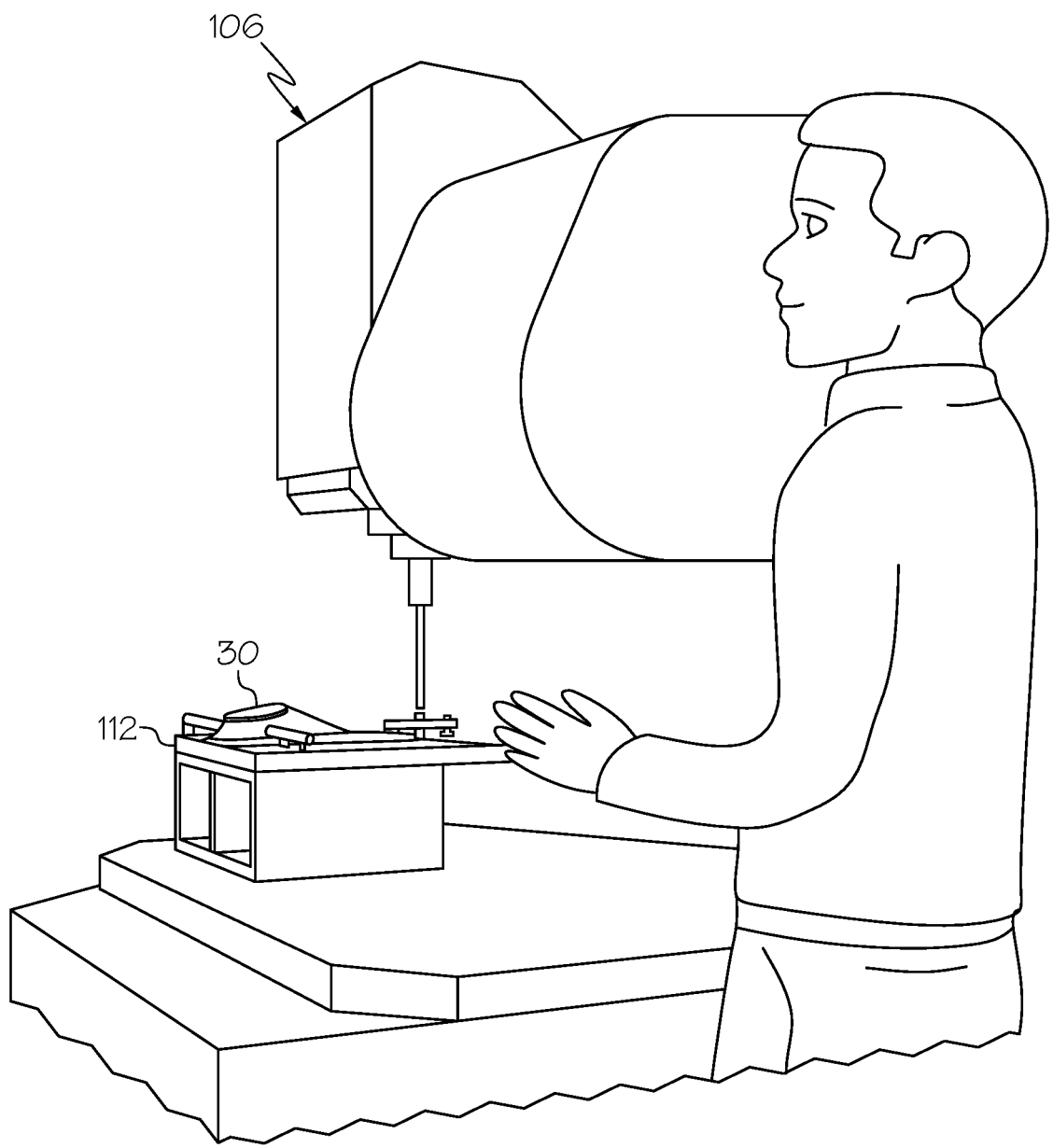
FIG. 10 is a perspective view of the upper sliced being clamped to a drilling fixture and having holes drilled into it by a CNC machine.

The 5-axis CNC machine 106 drills the holes in the work piece 21 and machine tapers the shims based on the NC programs 89. As illustrated in FIGS. 8 and 9, the fitting or work piece 21 may be secured on a drill fixture 110 or 112. Specifically, once each work piece 21 has been indexed into its respective drilling fixture 110 or 112, the work piece 21 shall be placed on a base 114 of the drill fixture 110 or 112 and clamped by clamps 116 in place with sufficient clamping forces to guarantee the work piece does not move with respect to its drilling fixture during machining operations. FIG. 10 shows the CNC machine 106 drilling the holes on a work piece 21 clamp in the drill fixture 110 based on the NC programs 89.

Figure 11:
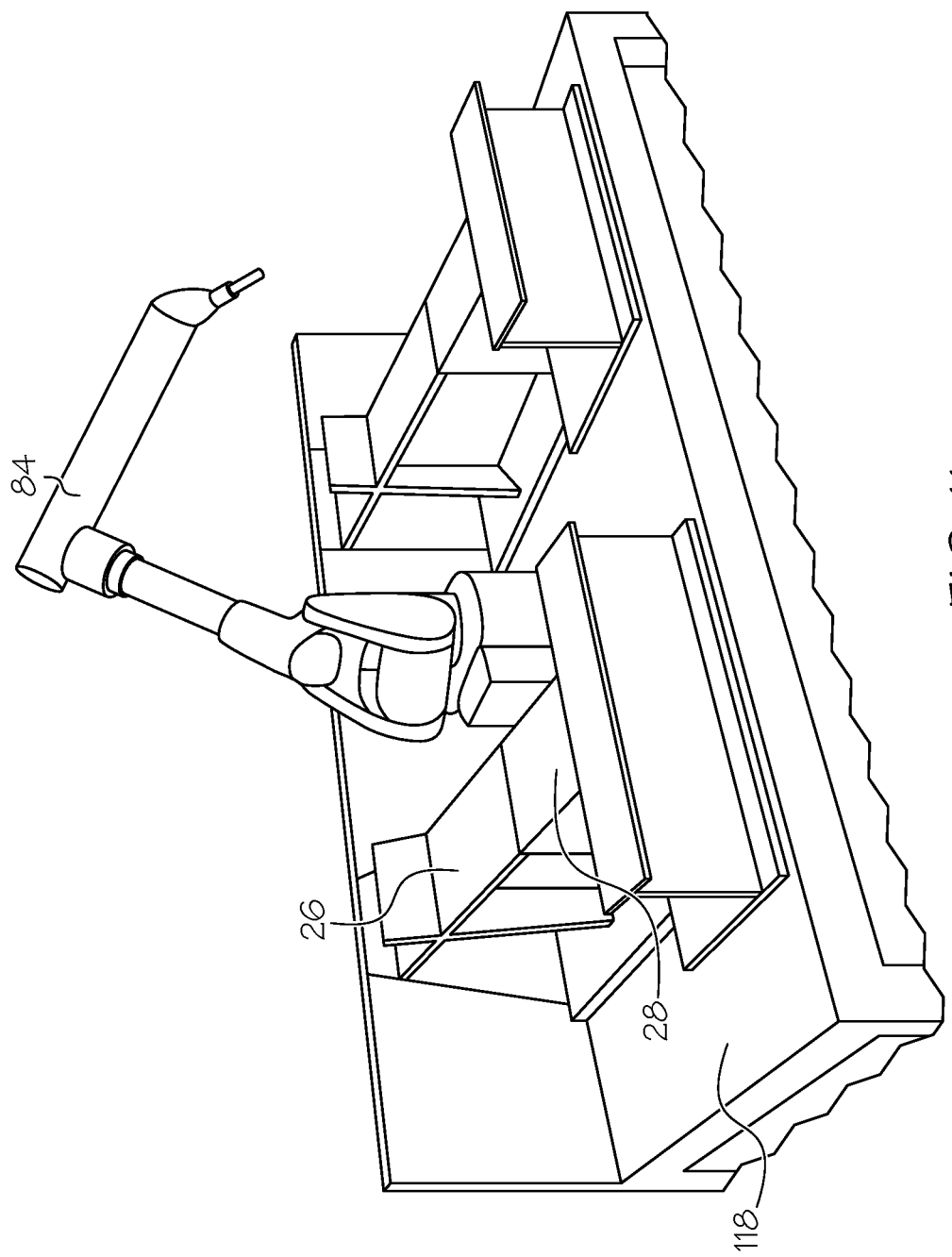
FIG. 11 is a perspective view of the transverse beam and stub beam arrangement and ROMER arm mounted on a support box which simulates the portion of the pressure deck that the transverse and stub beams would be mounted upon according to the embodiment of FIG. 1.
Figure 12:
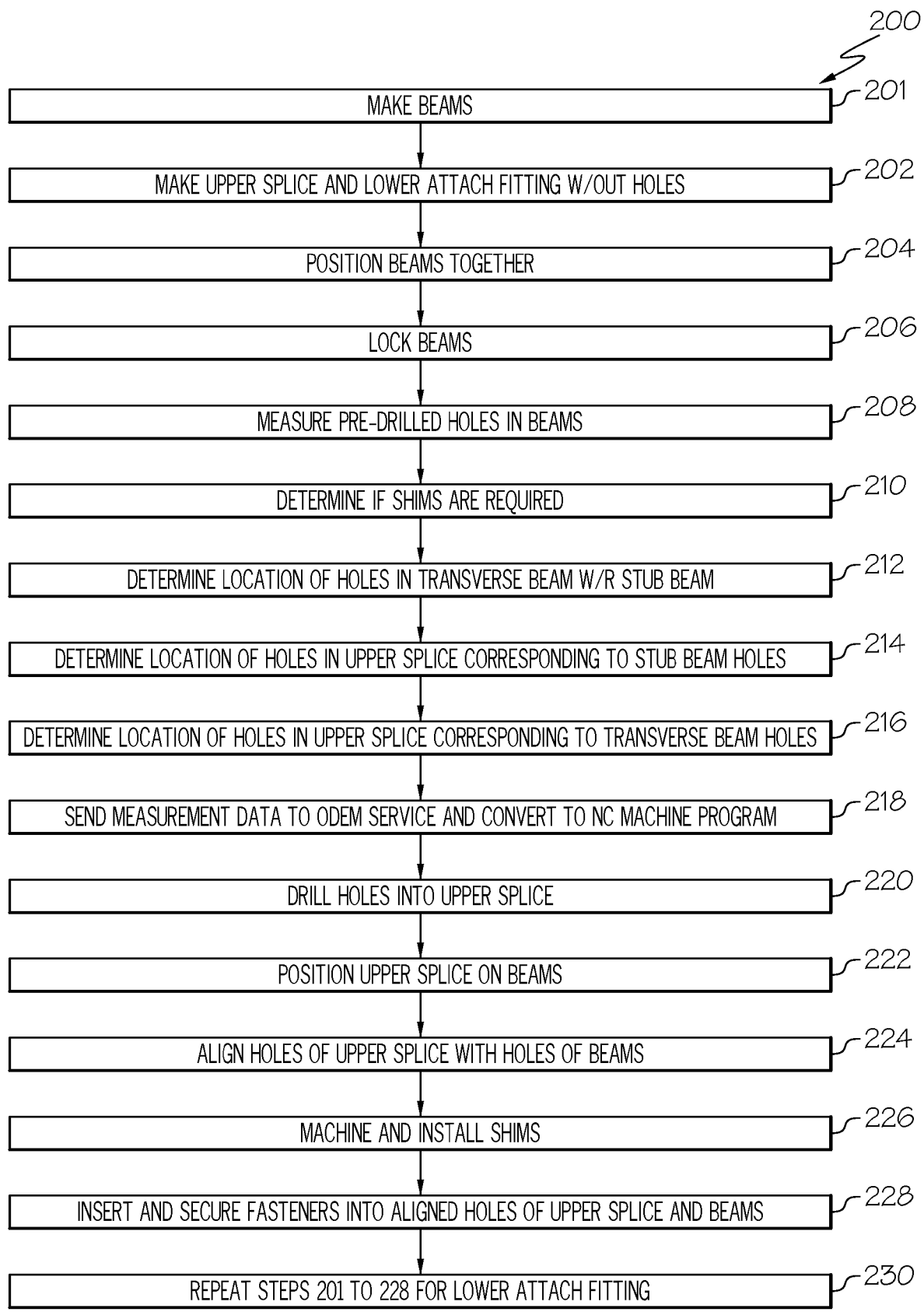
FIG. 12 is flow diagram of the method for joining the structural assembly according to the embodiment of FIG. 1.

The method 200 of fastening is illustrated in FIG. 12. In step 201, the transverse beam 28 and stub beam 26 are made with the pre-drilled holes 50, 52 at their pre-drilled locations. Then, in step 202, the upper splice 30 is made without pre-drilled holes but with nominal pre-defined location indicating approximately where full-size holes may be drilled later. In step 204, the transverse beam 28 and the stub beam 26 are brought together and positioned in a manner similar to that of the final assembly of the structure 24. Then, in step 206, the transverse beam 28 and stub beam 26 are locked together such that the beams have negligible freedom of movement relative to one another. This may be done on the fuselage 36 as shown in FIG. 5. Alternatively, the transverse beam 28 and stub beam 26 may be mounted on a support box 118 which simulates the portion of the pressure deck that the transverse and stub beams would be mounted upon as shown in FIG. 11.

In step 208, the location and orientation of the pre-drilled holes 50, 52 in the transverse beam 28 and the stub beam 26 are then measured within a single geometric frame of reference, such that the relative location of the pre-drilled holes 50 in the transverse beam 28 is measured with respect to the location of the pre-drilled holes 52 in the stub beam 26. This step may use the spatial analyzer 98 to direct the operator as to what to measure. The measuring is performed by an operator operating the ROMER arm machine 84 with the spatial analyzer 98 directing the operator as to what to measure. In particular, an operator positions the robotic measurement arm 90 of the ROMER arm 84 machine over each drilled hole of the stub beam 26 and transverse beam 28, such that the ROMER arm machine 84 takes a measurements of each drilled hole.

The measurements include the measured values along the X, Y, Z axes and the U, V, and W rotation axes. For example, a rotation $\phi$ of the stub beam surface about an axis lying in the nominal surface plane and parallel to the airplane Y-Z plane, represents component rotations of $\phi V$ about Y and $\phi W$ about Z as depicted in FIG. 7. As depicted in FIG. 5, the ROMER arm machine 84 may be slidably mounted on the track 92 in order to take measurements of the drilled holes as the ROMER arm machine 84 slides along the track 92. In step 210, a determination is made as to whether shims 69 are needed.

Then, the computer system 86 processes the measurements to determine the relative location of the drill holes 64T, 64S in the upper splice 30. In particular, the computer system 86 determines the relative location of the drill holes 50 in the transverse beam 28 with respect to the measured location of the pre-drilled holes 52 in the stub beam 26 in step 212. Then, in step 214, the computer system 86 determines the relative location of the holes 64S to be drill in the upper splice 30 that correspond to the pre-drilled holes 52 in the stub beam 26 by translating the measured pre-drilled hole locations 52 in the stub beam 26 to hole locations in the upper splice 30. This translating may be a best fit to the corresponding pre-determined nominal hole locations in the upper splice 30, using a least-square or other suitable method.

Then, in step 216, the computer system 86 determines the location of the holes to be drilled in the upper splice 30 that correspond to pre-drilled holes 50 in the transverse beam 28 by translating the measured locations of the pre-drilled holes 50 in the transverse beam 28 to the relative location of holes 50 in the transverse beam 28 with respect to the measured location of pre-drilled holes 52 in the stub beam 26. The computer system 86 transfers measured hole locations from the stub beam 26 to the relative locations on the transverse beam 28 implementing a datum sequence which forces residual measurement error in to the mating surfaces which also include shims.

In step 218, the measurement data set is sent to the ODEM service 88 and converted into the NC machine program 89. Specifically, the NC program 89 is created and validated to drill full size holes 64S, 64T in the upper splice 30 to substantially align with the measured location and orientation of the corresponding pre-drilled holes 52, 50 in the stub beam 26 and in the transverse beam 28. The NC program 89 is then sent to the CNC machine 106. The upper splice 30 is indexed into a drilling fixture 110 (FIG. 8), and then clamped in place with sufficient clamping forces to guarantee the upper splice 30 does not move with respect to the drilling fixture 110 during drilling or other machining operations. Then in step 220, full size holes 64S, 64T are drilled in the upper splice 30 using the CNC machine 106 according the NC program 89. This step 220 also includes installing any required fabricated shim with matching full size holes. In step 222, the upper splice 30 is then position on the mating surface 66, 67 of the transverse beam 28 and stub beam 26. In step 224, the drill holes 64S, 64T in the upper splice 30 are then aligned with the pre-drilled holes 52, 50 in the stub beam 26 and the transverse beam 28. In step 226, any necessary shims 69 are machined and installed on the structural components.

In step 228, the fasteners 68 are inserted through the aligned holes 64S, 52 of the upper splice 30 and the stub beam 26, and fasteners 68 are also inserted through the aligned holes 64T, 50 of the upper splice 30 and the transverse beam 28. This step also includes securing the fasteners 68 to their respective structural components. In step 230, steps 201 to 228 are repeated for fastening the lower attach fitting 32 to the transverse and stub beams 26, 28. In this step, the lower attach fitting may be mounted on the drill fixture 112 depicted in FIG. 9. This step also includes drilling holes 61 in the pressure deck 34, measuring the location and orientation of the holes 61 in the pressure deck 34, determining the location of the holes 72 of the lower attach fitting 32 that correspond to the holes 61 in the pressure deck 34, creating the NC program 89 to drill the holes 72 in the lower attach fitting 32 that correspond to the holes 61 in the pressure deck 34, drilling the holes 72 in the lower attach fitting 32 that correspond to the holes 61 in the pressure deck 34, and then aligning, inserting and securing fasteners 68 in the holes 72 in the lower attach fitting 34 that correspond to the holes 61 in the pressure deck 34.

In one exemplary structure 24, twelve holes are drilled approximately 7/16" diameter through the Titanium upper splices 30. Twenty two holes are drilled approximately 3/8" diameter through the four short titanium lower attach fittings 32. Twenty five holes are drilled approximately 3/8" diameter through the four long titanium lower attach fittings 32. One tapered shim 69 including oversized 7/16" holes is machined, as needed, for each of the eight upper splices 30. One tapered shim 69 including oversized 3/8" holes is machined, as needed, for each of the eight lower attach fittings 32. At the time the machined fittings are installed, the relative translation between any stub beam full size hole and any transverse beam full size hole, since the time the CMM measurements were taken, shall not exceed 0.0005 inches in any axis. At the time the machined fittings are installed, the relative angle between the stub beam to upper splice surface normal and transverse beam to upper splice surface normal, since the time the CMM measurements were taken, shall not exceed 0.02 degrees. Every hole of every work piece shall be verified for diameter, roundness, burr, and fit. Each shim is verified for functional fit on a plane.

The system 20 and method for joining structural components by drilling and fastening fasteners to the structural components may be used for other structures such as, for example, support fittings or T-clips. The disclosed system and method for joining structural components by drilling and fastening fasteners to the structural components provides several advantages. First, since the holes are drilled in a location away from the aircraft, no time consuming drilling or cleaning of the debris created by the drilling is performed during the fastening of the structural components to the aircraft. Also, the holes are drilled in a platform that is more stable than the aircraft, thus resulting in a smaller percentage of oversize holes and associated production tags. Further, the ergonomic risk factors resulting from operators drilling the holes in major joint areas associated with the primary structure components around the perimeter of the fuselage and/or in the wing box cavity of an airplane are eliminated. In addition, this method can be used in the areas where confined volume does not allow enough room for use of the manual drilling equipment.

Figure 13:
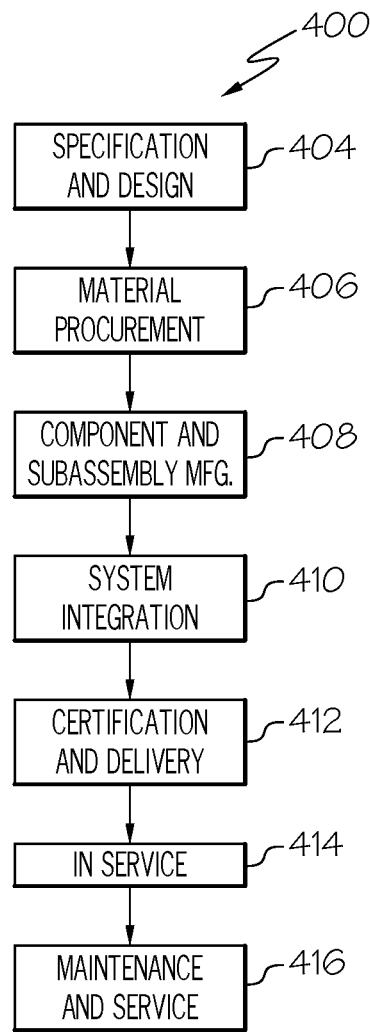
FIG. 13 is flow diagram of an aircraft manufacturing and service methodology.
Figure 14:
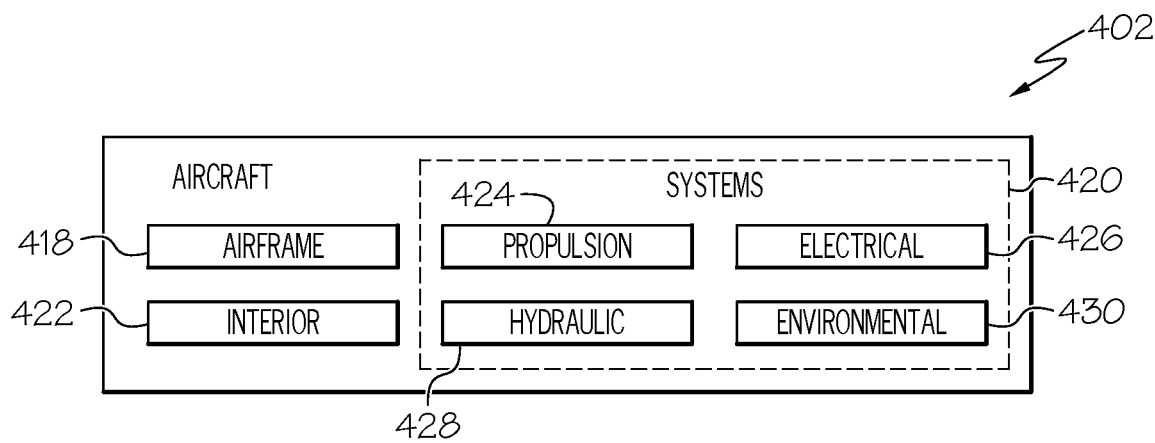
FIG. 14 is a block diagram of an aircraft.

Examples of the disclosure may be described in the context of an aircraft manufacturing and service method 400, as shown in FIG. 13, and an aircraft 402, as shown in FIG. 14. During pre-production, the aircraft manufacturing and service method 400 may include specification and design 404 of the aircraft 402 and material procurement 406. During production, component/subassembly manufacturing 408 and system integration 410 of the aircraft 402 takes place. Thereafter, the aircraft 402 may go through certification and delivery 412 in order to be placed in service 414. While in service by a customer, the aircraft 402 is scheduled for routine maintenance and service 416, which may also include modification, reconfiguration, refurbishment and the like.

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 14, the aircraft 402 produced by example method 400 may include an airframe 418 with a plurality of systems 420 and an interior 422. Examples of the plurality of systems 420 may include one or more of a propulsion system 424, an electrical system 426, a hydraulic system 428, and an environmental system 430. Any number of other systems may be included.

The disclosed system for joining structural components by drilling and fastening fasteners to the structural components may be employed during any one or more of the stages of the aircraft manufacturing and service method 400. As one example, the disclosed system for joining structural components by drilling and fastening fasteners to the structural components may be employed during material procurement 406. As another example, components or subassemblies corresponding to component/subassembly manufacturing 408, system integration 410, and or maintenance and service 416 may be fabricated or manufactured using the disclosed fastening system. As another example, the airframe 418 and/or the interior 422 may be constructed using the disclosed fluid-tight mechanical fastening system. Also, one or more apparatus examples, method examples, or a combination thereof may be utilized during component/subassembly manufacturing 408 and/or system integration 410, for example, by substantially expediting assembly of or reducing the cost of an aircraft 402, such as the airframe 418 and/or the interior 422. Similarly, one or more of system examples, method examples, or a combination thereof may be utilized while the aircraft 402 is in service, for example and without limitation, to maintenance and service 416.

The disclosed system for joining structural components by drilling and fastening fasteners to the structural components are described in the context of an aircraft; however, one of ordinary skill in the art will readily recognize that the disclosed system for joining structural components by drilling and fastening fasteners to the structural components may be utilized for a variety of vehicles, as well as for non-vehicle applications. For example, implementations of the embodiments described herein may be implemented in any type of vehicle including, e.g., helicopters, passenger ships, automobiles and the like.

Although various embodiments of the system for joining structural components by drilling and fastening fasteners to the structural components have been shown and described, modifications may occur to those skilled in the art upon reading the specification. The present application includes such modifications and is limited only by the scope of the claims.

What is claimed is:

1. A method comprising:
   making a first structure with a first plurality of pre-drilled holes at pre-defined locations;
   making a second structure with a second plurality of pre-drilled holes at pre-defined locations;
   making a third structure without pre-drilled full-size holes;
   positioning together the first structure and the second structure;
   after the positioning, measuring a location and an orientation of the first plurality of pre-drilled holes and a location and an orientation of the second plurality of pre-drilled holes;
   based on the measuring, determining a location of a third plurality of holes to be drilled in the third structure that correspond to the first plurality of pre-drilled holes and the second plurality of pre-drilled holes;
   based on the determining, creating a program to drill the third plurality of holes in the third structure that align with the location and the orientation of the first plurality of pre-drilled holes and the location and the orientation of the second plurality of pre-drilled holes;
   drilling the third plurality of holes in the third structure based on the program;
   positioning the third structure on the first structure and the second structure such that the third plurality of holes in the third structure are aligned with the first plurality of pre-drilled holes in the first structure and the second plurality of pre-drilled holes in the second structure; and
   inserting fasteners through the third plurality of holes, the first plurality of pre-drilled holes, and the second plurality of pre-drilled holes to secure the second structure to the first structure using the third structure.

2. The method of claim 1 wherein measuring a location and an orientation of the first plurality of pre-drilled holes in the first structure and a location and an orientation of the second plurality of pre-drilled holes in the second structure is performed within a single geometric frame of reference such that a relative location of the second plurality of pre-drilled holes is determined with respect to the location of the first plurality of pre-drilled holes.

3. The method of claim 2 wherein determining the location of the third plurality of pre-drilled holes to be drilled in the third structure that correspond to the first plurality of holes measured in the first structure comprises translating the location of the first plurality of pre-drilled holes measured in the first structure to the third structure.

4. The method of claim 3 wherein determining the location of the third plurality of holes to be drilled in the third structure that correspond to the second plurality of pre-drilled holes measured in the second structure comprises determining the location of the holes to be drilled in the third structure that correspond to the second plurality of pre-drilled holes in the second structure by translating the location of the second plurality of pre-drilled holes measured in the second structure to the relative location of the second plurality of pre-drilled holes with respect to the location of the first plurality of pre-drilled holes measured in the first structure.

5. The method of claim 4 further comprising locking together the first structure and the second structure such that the first structure and the second structure have negligible freedom of movement relative to one another prior to or while measuring the location and the orientation of the first plurality of pre-drilled holes in the first structure.

6. The method of claim 5 wherein translating the first plurality of pre-drilled hole locations measured in the first structure to a plurality of hole locations in the third structure is performed using a least-squares method.

7. The method of claim 1 wherein the creating of the program comprises generating an NC program for drilling the third plurality of holes in the third structure based on the location and the orientation of the first plurality of pre-drilled holes measured in the first structure and the location and the orientation of the second plurality of pre-drilled holes measured in the second structure.

8. The method of claim 1 wherein the measuring of the location and the orientation of the first plurality of pre-drilled holes and the location and the orientation of the second plurality of pre-drilled holes comprises using a coordinate measurement machine to measure at least one of the first structure and the second structure in a 3D coordinate system.

9. The method of claim 8 wherein the coordinate measurement machine comprises a ROMER arm machine.

10. The method of claim 8 further comprising processing the location and the orientation measurements of the first plurality of pre-drilled holes and the second plurality of pre-drilled holes in an .XML format.

11. The method of claim 8 wherein the coordinate measurement machine comprises a hand held measuring device or a laser scanner.

12. The method of claim 1 wherein the drilling of the third plurality of holes in the third structure further comprises clamping the third structure to a drill fixture and drilling the third plurality of holes using a CNC machine.

13. The method of claim 1 wherein:
   the first structure comprises a first mating surface;
   the second structure comprises a second mating surface;
   the third structure comprises a third mating surface configured to mate with at least one of the first mating surface and the second mating surface; and
   the method further comprises:
      determining a surface geometry of at least one of the first mating surface, the second mating surface, and the third mating surface; and
      determining, based on the surface geometry, at least one of an optimal shim thickness and an optimal shim taper angle.

14. The method of claim 13 further comprising fabricating a shim in accordance with at least one of the optimal shim thickness and the optimal shim taper angle.

15. The method of claim 1 further comprising shimming at least one of the first structure, the second structure and the third structure.

16. A method comprising:
   making a first structure with a first plurality of pre-drilled holes at pre-defined locations;
   making a second structure with a second plurality of pre-drilled holes at pre-defined locations;
   making a third structure without pre-drilled full-size holes;
   securing a platform having a track adjacent to the first structure and the second structure;
   slidably mounting a measurement machine to the track so that the measurement machine is slidable to take measurements of selected areas on at least one of the first structure, the second structure and the third structure;

measuring a location and an orientation of the first plurality of pre-drilled holes in the first structure and a location and an orientation of the second plurality of pre-drilled holes in the second structure using the slidable mounted measurement machine determining a location of a third plurality of holes to be drilled in the third structure that correspond to the first plurality of pre-drilled holes measured in the first structure and the second plurality of pre-drilled holes measured in the second structure;

creating a program to drill the third plurality of holes in the third structure that align with the measured location and the orientation of the first plurality of pre-drilled holes and the location and orientation of the second plurality of pre-drilled holes in the first structure and the second structure based on the location and the orientation of the first plurality of pre-drilled holes in the first structure and the location and orientation of the second plurality of pre-drilled holes in the second structure;

drilling the third plurality of holes in the third structure based on the program;

positioning the third structure on the first structure and the second structure such that the third plurality of holes in the third structure are aligned with the first plurality of pre-drilled holes in the first structure and the second plurality of pre-drilled holes in the second structure; and inserting fasteners through the third plurality of holes of the third structure, the first plurality of pre-drilled holes of the first structure, and the second plurality of pre-drilled holes of the second structure that are aligned with the third plurality of holes of the third structure to the second structure to the first structure using the third structure.

17. The method of claim 16 wherein the measurement machine is a ROMER arm machine.

18. The method of claim 17 further comprising:
obtaining repeated measurements of at least one of the first structure, the second structure, and the third structure; and
comparing the repeated measurements to one another to determine whether a variance between each repeated measurement is within a predetermined allowed margin of error.

19. A method comprising:
making a stub beam with a first plurality of pre-drilled holes at pre-defined locations;
making a transverse beam with a second plurality of pre-drilled holes at pre-defined locations;
making a splice without pre-drilled full-size holes;
securing the stub beam and the transverse beam on a fuselage such that the stub beam and the transverse beam have negligible freedom of movement relative to one another;
measuring a location and an orientation of the first plurality of pre-drilled holes in the stub beam and a location and an orientation of the second plurality of pre-drilled holes in the transverse beam;
determining a location of a third plurality of holes to be drilled in the splice that correspond to the first plurality of pre-drilled holes measured in the stub beam and the second plurality of pre-drilled holes measured in the transverse beam;
creating a program to drill the third plurality of holes in the splice that align with the location and the orientation of the first plurality of pre-drilled holes in the stub beam and the location and orientation of the second plurality of pre-drilled holes in the transverse beam based on the measured location and the orientation of the first plurality of pre-drilled holes in the stub beam and the second plurality of pre-drilled holes in the transverse beam;
drilling the third plurality of holes in the splice based on the program;
positioning the splice on the stub beam and the transverse beam such that the third plurality of holes in the splice are aligned with the first plurality of pre-drilled holes in the stub beam and the second plurality of pre-drilled holes in the transverse beam;
inserting fasteners through the third plurality of holes of the splice and the first plurality of pre-drilled holes of the stub beam and the second plurality of pre-drilled holes of the transverse beam that are aligned with the third plurality of holes of the splice to secure the transverse beam to the stub beam using the splice; and
locking together the stub beam and the transverse beam with the splice.

20. The method of claim 19 wherein:
the stub beam comprises a fourth plurality of pre-drilled holes;
the transverse beam comprises a fifth plurality of pre-drilled holes; and
the method further comprises:
making an attach fitting that comprises a sixth plurality of pre-drilled holes, wherein a location and an orientation of the sixth plurality of pre-drilled holes are based on a location and an orientation of the fourth plurality of pre-drilled holes of a stub beam and a location and orientation of the fifth plurality of pre-drilled holes of the transverse beam; and
fastening the attach fitting to the stub beam and the transverse beam.

* * * * *